INVENTORS.
GEOFFREY D. R. DOBBINS
HAROLD K. MONEYPENNY
JOHN R. WYCHERLEY
By
Kurt Kelman
AGENT

INVENTORS.
GEOFFREY D. R. DOBBINS
HAROLD K. MONEYPENNY
JOHN R. WYCHERLEY

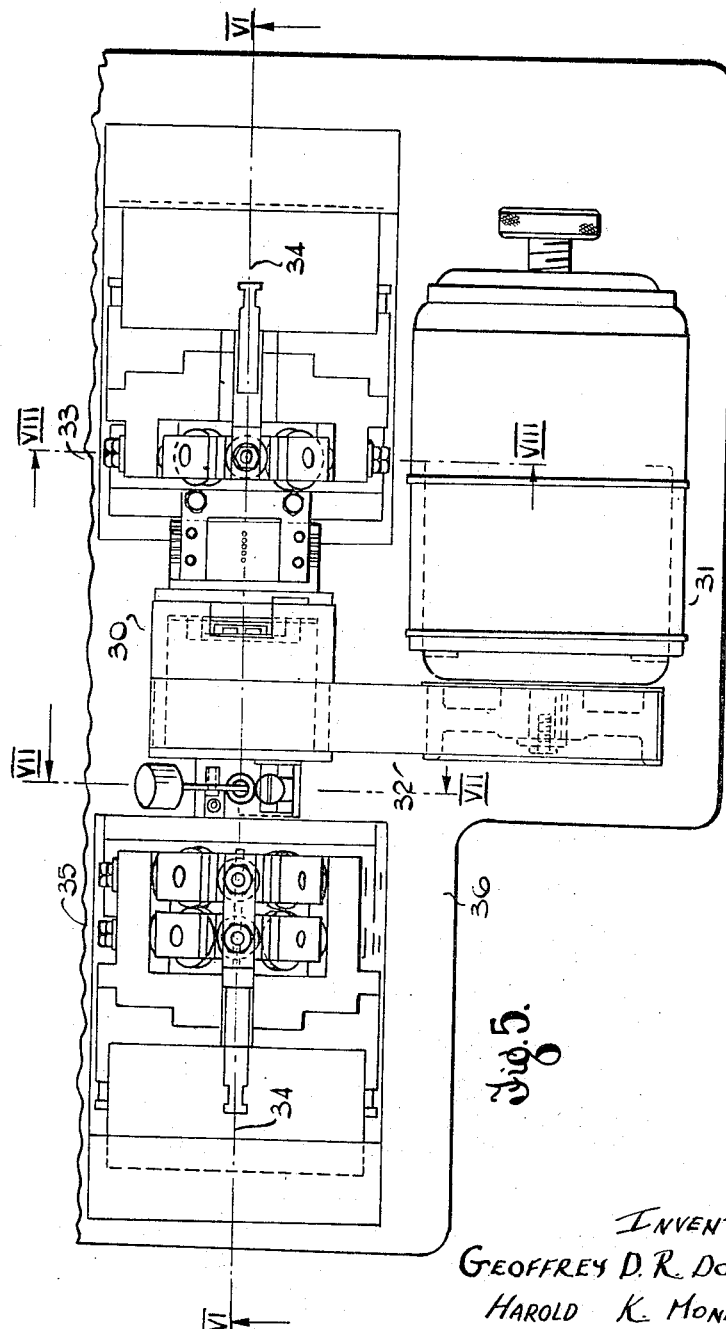

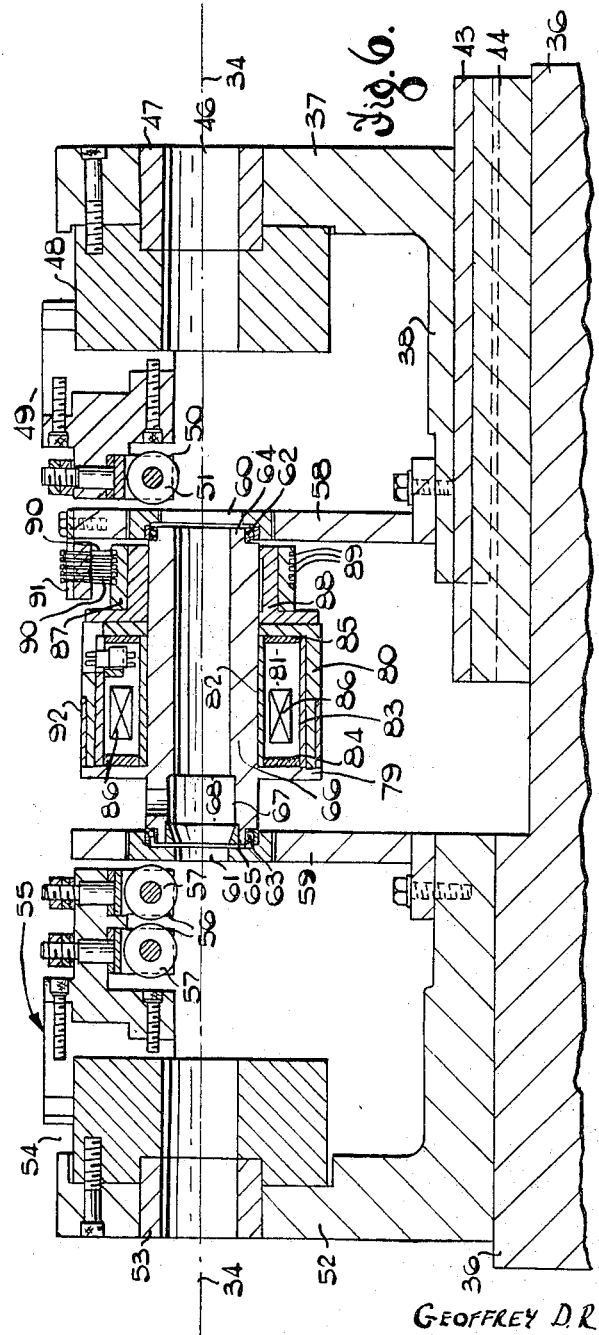

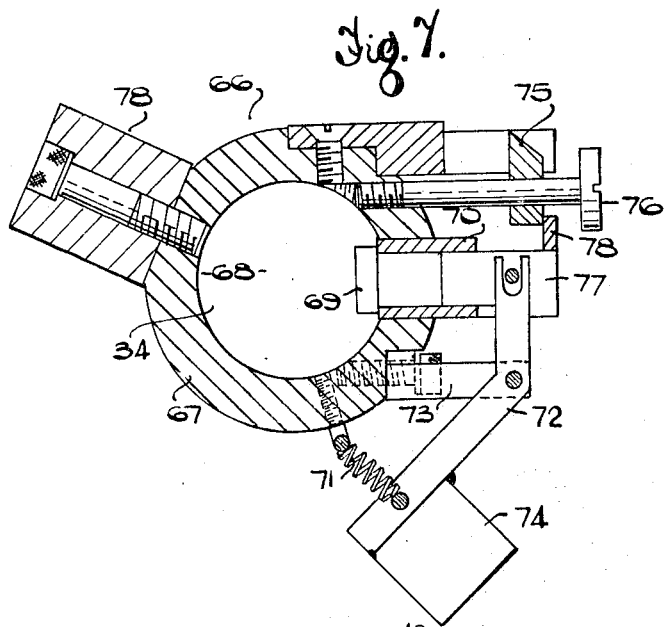
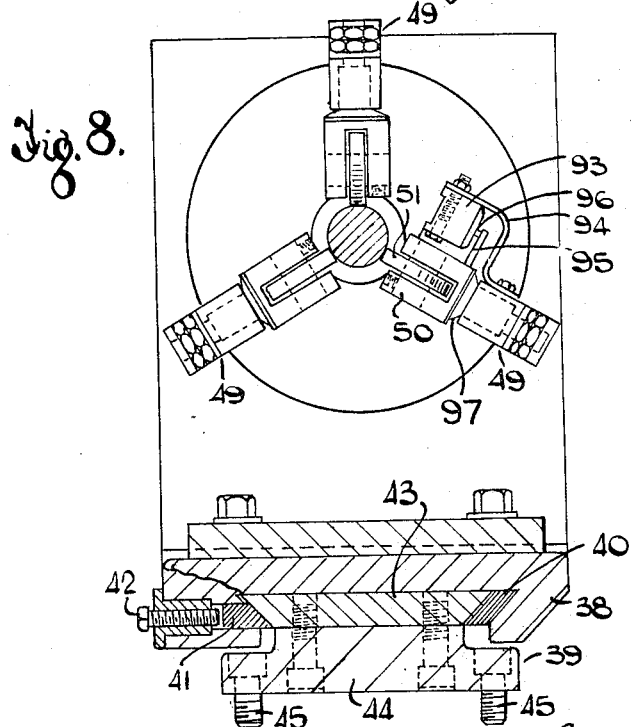

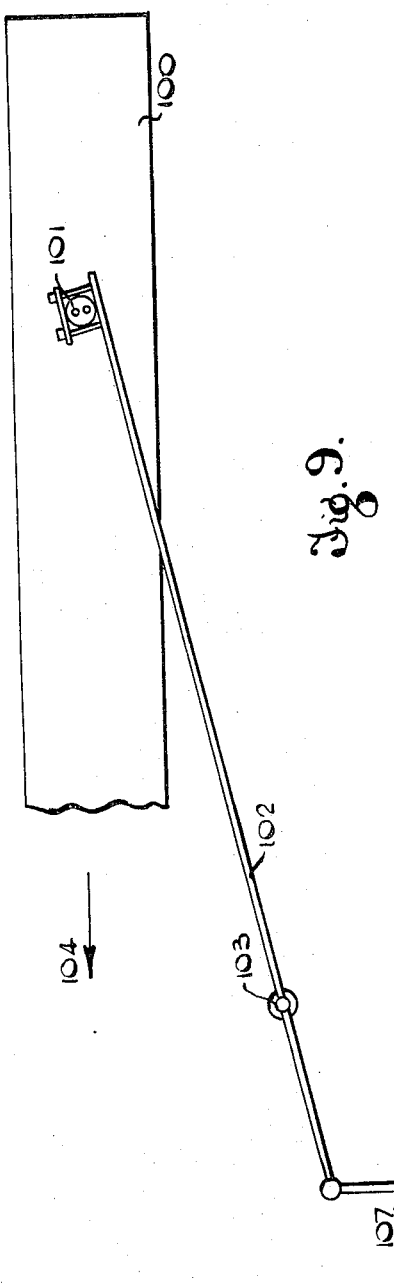

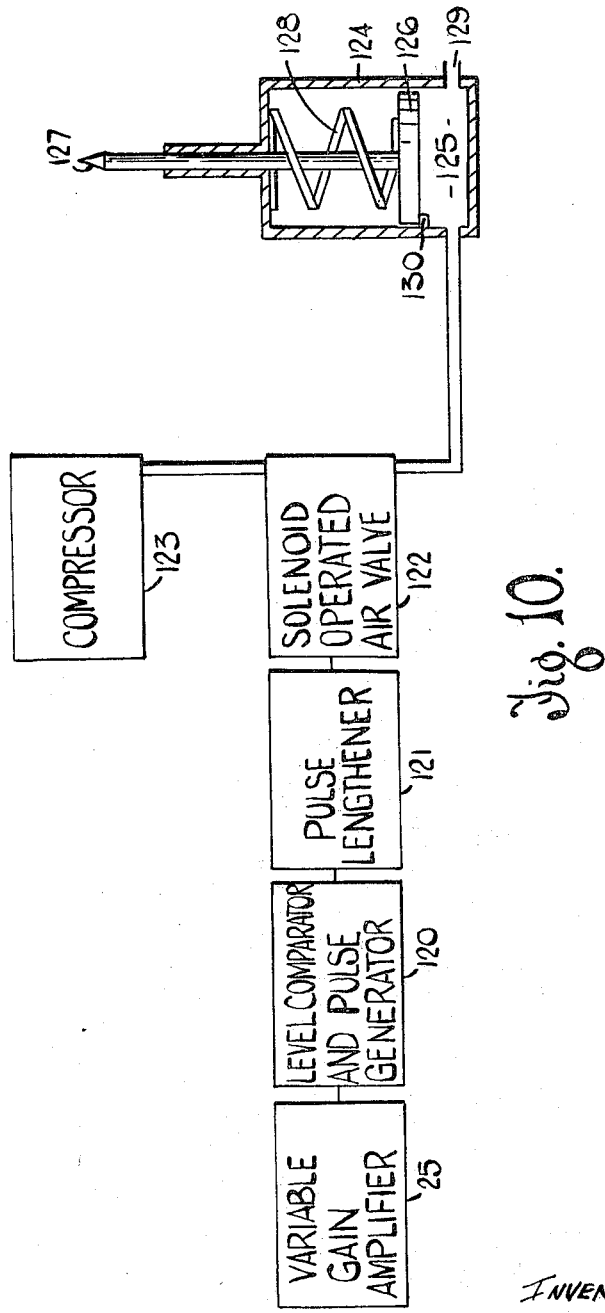

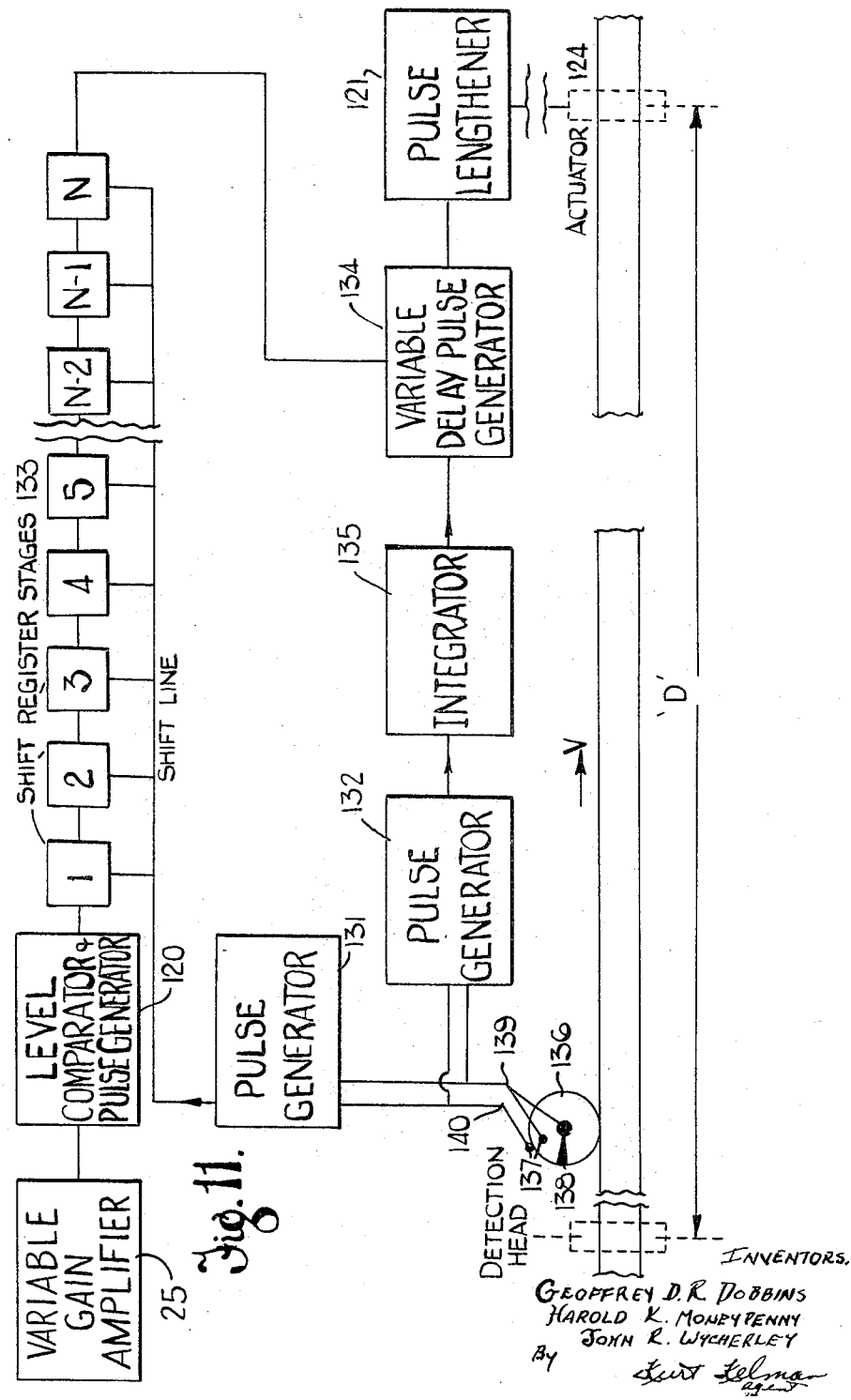

United States Patent Office 3,281,667
Patented Oct. 25, 1966

3,281,667
EDDY CURRENT FLAW DETECTOR UTILIZING A FIELD COIL AND PICK-UP COILS IN APPROXIMATELY PARALLEL RELATION TO THE TEST PIECE WITH THE PICK-UP COILS LOCATED WITHIN THE FIELD COIL
Geoffrey David Rosser Dobbins, Wednesfield, Harold Kenneth Moneypenny, Wolverhampton, and John Ralph Wycherley, Penn, Wolverhampton, England, assignors to G.K.N. Group Services Limited, Smethwick, England, a British company
Filed Oct. 13, 1961, Ser. No. 144,974
Claims priority, application Great Britain, Oct. 14, 1960, 35,381/60; Feb. 24, 1961, 6,777/61
5 Claims. (Cl. 324—40)

This invention relates to a method of and apparatus for the detection of cracks or similar flaws, all hereinafter referred to as flaws, in coherent solids and is applicable to solids which are electrically conductive. Such solids may be in the form of blocks, sheets, rods, wires or other forms of stock from which articles are made, or may be in the form of articles themselves or parts thereof, subject to such articles presenting surfaces suitable for subjection to the flaw detection method and apparatus hereinafter described, all such solids or articles hereinafter being referred to for convenience as "workpieces."

The invention has been developed primarily for use in detecting flaws in the form of cracks in workpieces which form, or which after manufacture will form, articles which are stressed mechanically, such cracks often being of extremely small size so that they are incapable or not readily capable of being detected by visual inspection. Other types of flaws which the method and the apparatus of the present invention would be capable of detecting, however, include abrupt changes in the composition of the material affecting its electrical conductivity or magnetic permeability, such for example as electrically non-conductive impurities embedded or included in the material of the workpiece.

One method whereby it is possible to detect the presence of flaws is to establish electromagnetic coupling between the surface layer of a workpiece and a pick-up device, and derive a signal dependent upon this coupling which is modulated whenever a flaw is present in the particular elemental area of the surface layer under test. One of the difficulties however, in obtaining quantitative data as to the dimensions of the flaw or even possibly as to the detecting of the flaw itself, if this is dimensionally small, is that the signal may also be modulated as a function of the distance between the surface and the detector device, and this modulation may mask or otherwise interfere with the selective extraction of that due to the presence of a flaw.

One of the objects of the present invention is to provide a new or improved method for the detection of flaws in which modulation of the flaw signal in consequence of variation of the distance between the surface of the workpiece and the detector device is eliminated or reduced.

With this object in view there is provided apparatus for testing workpieces of electrically conductive material comprising a detector head including winding means for establishing electromagnetic coupling with a surface layer of a workpiece, scanning means for effecting relative movement between said detector head and said workpiece in a direction generally parallel to said surface layer, signal generator means operatively coupled with said winding means for generating a high frequency carrier signal therein and an eddy current pattern in circuits afforded by said surface layer, indicator means responsive to flaw modulation of said carrier signal in said winding means, variable gain amplifier means connecting said indicator means with said winding means, and compensating means including a resonant circuit containing a capacitance and an inductance whereof the value of the latter is variable as a function of distance between said detector head and said surface layer in a direction normal to the latter, said resonant circuit being connected operatively with said variable gain amplifier to vary the gain thereof to compensate at least partly for modulation of said carrier signal with any variation of said distance.

A further object of the present invention is to provide a new or improved apparatus which enables flaws to be detected in workpieces of elongated form such as rod or wire.

Thus there is further provided in accordance with the invention apparatus for flaw testing workpieces of electrically conductive material comprising guide means defining a feed path for said workpiece through a detection station, a detector head at said station including a field winding arranged in closely spaced at least approximately parallel relation to the surface of said workpiece at said detection station to overlie an elemental area of such surface, and a plurality of pick-up coils having their turns close to and at least approximately parallel to said surface and overlying said elemental area, a source of high frequency alternating electric current forming a carrier operatively connected with said field winding for setting up an alternating magnetic field in a surface layer of said workpiece at said detection station to induce a predetermined eddy current pattern in circuits afforded by this layer in said elemental area, mechanical means for effecting relative scanning movement in a predetermined direction between said workpiece on the one hand and said detector head on the other hand to cause said workpiece to move past said pick-up coils without movement through them, said pick-up coils being spaced apart from each other in said predetermined direction to overlie separate respective portions of said elemental area, indicator means operatively connected with said pick-up coils and including amplifier means and de-modulation means for separating from said carrier a modulation component of alternating voltages induced in said pick-up coils respectively and produced in response to said relative movement whenever a flaw in said surface layer of said workpiece passes said pick-up coils.

A form of apparatus for flaw testing such workpieces which are of elongated rod-like form preferably comprises a rotary head on which said detector head is mounted, said feed path defined by said guide means extending axially of said rotary head to permit of longitudinal movement therealong of an elongated workpiece of circular cross section, and said pick-up coils being mounted at positions spaced apart angularly about said feed path and having their coils disposed in planes at least approximately tangential to the surface of said workpiece while being spaced closely therefrom.

Yet another object of the invention is to enable marking of workpieces to be effected at a station remote from the detection station so as accurately to detect the position occupied by a flaw without the marking means being obstructed by the detection head of the apparatus.

Further objects and features of the apparatus and method will be apparent from the following description of preferred embodiments thereof illustrated in the accompanying drawings, and wherein:

FIGURE 5 illustrates a constructional embodiment of the apparatus intended for use primarily in detecting flaws in elongated workpieces such as wire or rod stock or tubular stock.

FIGURE 6 is a fragmentary view of the apparatus in cross section on the line 6—6 of FIGURE 5.

FIGURE 7 is a a fragmentary cross sectional view of the apparatus on the line 7—7 of FIGURE 5.

FIGURE 8 is a fragmentary cross sectional view of the apparatus on the line 8—8 of FIGURE 5.

FIGURE 9 illustrates a modified form of apparatus wherein scanning of plane-faced workpieces is required to be performed by the detector device.

Figure 1:
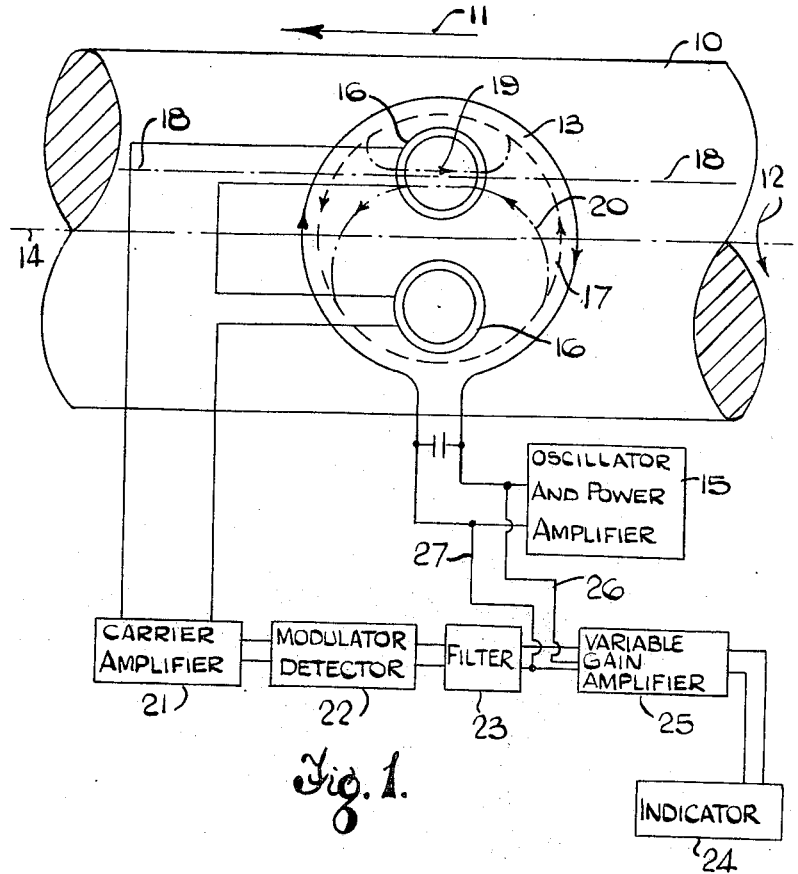
FIGURE 1 is a schematic circuit diagram of the apparatus shown also the positional relationship of the detector device thereof to the workpiece.
Figure 2:
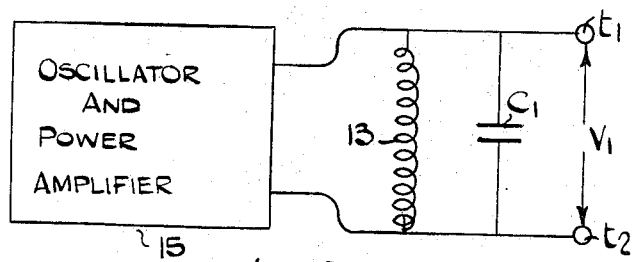
FIGURE 2 is a schematic circuit diagram of the resonance circuit incorporating the field coil and which is connected to the oscillator and power amplifier.

FIGURE 10 illustrates diagrammatically a marking apparatus for marking a workpiece at a predetermined position in relation to a flaw, and FIGURE 11 is a schematic circuit diagram illustrating a marking means applicable to a form of apparatus wherein marking is required to be effected at a marking station remote from the detection station and situated on the path of travel of the workpiece after it leaves the detection station.

Referring firstly to FIGURES 1 to 4 which illustrate the invention diagrammatically, the workpiece may be in the form of stock undergoing test, and may comprise a rod or wire 10 of circular form in cross section. Driving means not illustrated) may be applied to the stock in such a way as to cause this to move longitudinally in the direction of the arrow 11, preferably continuously at a uniform speed, whilst also rotating it as indicated by the arrow 12 at a uniform angular velocity.

The stock may, for example, comprise ferrous metal wire which has been passed through a wire drawing die, and the testing apparatus may be disposed at the exit side of the die.

As illustrated, the testing apparatus comprises a field winding in the form of a single turn coil 13 which may be of circular form, and lie in a part-cylindrical plane concentric with the axis 14 of the stock which forms the workpiece. The field structure 13 is fed with an alternating electric current from an oscillator and power amplifier 15. The frequency of this current is believed not critical and may typically lie in the range 1 kc./s. to 5 mc./s.

The coil 13 may typically have a diameter of about 0.3 inch. As illustrated this diameter is less than the diameter of the workpiece under test. The apparatus will, however, operate satisfactorily even if the diameter of the workpiece under test is less than that the coil 13.

Within the field coil 13 are disposed a pair of pick-up coils 16 each of which may contain a plurality of turns, although possibly single turn pick-up coils may be employed if desired.

These two pick-up coils present faces or ends towards the workpiece co-planar with the end or face of the field coil 13 presented towards the workpiece, and collectively they may thus lie in a part-cylindrical surface concentric with the axis 14.

It will be understood that where the curvature of the circumferential face of the workpiece 10 is small or where this surface is of flat plane form, the coils 13 and 16 would have their faces or ends which are presented towards the workpiece disposed in a common flat plane spaced at a constant distance from the surface of the workpiece.

Any suitable structure may be provided for maintaining so far as possible constant distance or separation between the coils 13 and 16 and the surface of the workpiece 10.

The coils 16 are connected in series with each other and in such a way that the voltages induced therein oppose each other, these voltages preferably being of equal or nearly equal magnitude so as to provide zero or a low value of datum signal when the surface layer of the workpiece situated beneath the elemental area enclosed by the field coil is free from flaws.

Under these conditions, the high frequency alternating magnetic field to which the surface layer of the workpiece is subjected, produces a symmetrical eddy-current pattern within the elemental area, the direction of eddy-currents being shown diagrammatically opposite to the direction of the instantaneous current in the coil 13.

The broken line 17 shows a typical eddy-current path which would exist in the absence of flaws within the elemental area.

The mutual inductance between one of the pick-up coils 16 and the field coil 13 is equal to the mutual inductance between the other of the pick-up coils and the field coil 13, this mutual inductance being made up partly of a direct coupling between the pick-up coils and the field coil, i.e. which would exist even in the absence of a workpiece, and indirect coupling, i.e. through the intermediary of the workpiece by virtue of the current paths afforded by the surface layer in which the eddy-currents are set up.

It is thus preferred that both these components of coupling shall be equal for the two pick-up coils 16 respectively, and that so far as possible the indirect coupling shall be the predominating influence in setting up induced voltages in the pick-up coils, so that any change in the indirect coupling will produce maximum change as between the relative values of voltage induced in the pick-up coils 16.

The line 18 indicates the position of a crack in the surface layer of the workpiece, and it will be evident that in consequence of the rotation of the workpiece, this crack 18 will travel through the elemental area from top to bottom, as seen in the drawing, and also from right to left by virtue of the longitudinal movement of the workpiece shown by the arrow 11. For a typical position of the crack 18 the eddy-current pattern will be disturbed since the crack constitutes a region af electrical discontinuity or high resistance, and typically the eddy-current pattern may be sub-divided into two loops as indicated by the chain lines 19 and 20. It will be evident that the upper of the two pick-up coils 16, so far as its indirect coupling with the field coil 13 is concerned, has anti-phase voltages induced therein from the two eddy-current loops 19 and 20, and hence will have a reduced overall induced voltage, whereas the indirect coupling pertaining to the lower pick-up coils 16, results predominantly fram the eddy-current loop 20.

It will be understood that the loops 19 and 20 are a simplified diagrammatic illustration only and that in practice the disturbance of the eddy-current pattern resulting from the presence of a crack is more complex. A crack will not normally confine the eddy-currents to two distinct loop-like paths without passage of an eddy-current from one side of the crack to the other, since some eddy-current will pass beneath the bottom or inner extremity of the crack.

The amplitude of the resultant signal obtained from the pick-up coils 16 in combination provides a measure of crack dimensions, specifically the depth of the crack. The amplitude of this signal may, over a range of crack depths be an approximately linear function of the crack depth. In order, however, to prevent variations in the amplitude of the signal due to relative movement between the head of the detector device in which the field structure and the coils 13 and 16 are mounted masking or adversely interfering with amplitude variations due to variations in crack depth, an auxiliary signal is derived as hereinafter explained in detail to compensate for variations of positions between the detector head and the surface of the workpiece in a direction normal to the latter, i.e., radial to the axis 14.

Reverting to the general manner of operation of the apparatus, it is pointed out that the resultant voltage induced in the upper coil 16 will be less than that induced in the lower coil 16, and a resultant output will be fed to the carrier amplifier 21 as an amplitude modulation and possibly as a phase modulation of the carrier.

As the crack 18 moves towards the lower side of the elemental area, as seen in the diagram, the conditions pertaining to the two coils 16 will be reversed and the form of the amplitude modulation will, in general, therefore, be an increase in the level of the carrier followed by a decrease or vice versa according to the direction of travel of the crack.

The output of the amplifier 21 is fed to the de-modulator or detector 22 and then preferably through a filter 23 which will pass the modulation frequency, and will reject unwanted frequencies such as the carrier frequency, and sum and difference frequencies of the carrier, and modulation frequencies.

It will be understood that if it is required to detect phase modulation of the carrier, the detector 22 will require to be fed with a reference signal having a constant phase relation with the carrier, and conveniently this may be derived from the oscillator and power amplifier 15.

The filter output is fed to amplifier means 25 for amplifying the modulation signal. This amplifier is arranged to provide variable gain which is controlled from an auxiliary signal fed through the lines 26 and 27 from the circuit of the field coil 13 as hereinafter described in greater detail.

The output from the amplifier means 25 is fed to an indicator 24 which may be of any convenient type, for example a cathode ray oscilloscope or a circuit including relay means responsive to the application of a signal from the filter to energise indicator means, either visual or audible.

Furthermore, a marking device may be provided to mark the position on the surface of the workpiece at which a flaw has been detected. Such marking device may be in the form of a device for spraying or projecting a marking liquid, or possibly for grinding or otherwise machining a mark at the proper position on the surface of the workpiece, these devices being controlled electrically from the output of the variable gain amplifier.

Referring now to the means for generating the auxiliary signal (reference is made firstly to FIGURE 2) wherein the field coil 13, shown as a circuit element, is connected with a capacitor $C_1$ to form a parallel resonant circuit furnishing a control voltage $V_1$ at output terminals $t_1$ and $t_2$.

The frequency of resonance of the circuit comprising the field coil 13 and the capacitor $C_1$ is determined by the value of the capacitor $C_1$ and also by the value of inductance afforded by the field coil 13 which in turn is dependent upon the distance by which this is spaced from the surface of the workpiece 10.

Ordinarily, the head of the detector device is maintained at a constant distance from the surface of the workpiece 10 so far as possible, but variations may occur in this distance due possibly to variations in the diameter of the workpiece itself, occasioned by manufacturing tolerances and due also to the mounting arrangements for the workpiece and for the detector head which may admit unavoidably of some displacement of the workpiece or the head, as the case may be.

Such variations in distance would produce variations in the amplitude of the modulation of the carrier signal fed out from the two pick-up coils 16 and hence also in the signal fed from the modulation detector 22 through the filter 23 to the amplifier means 25.

It may be required to obtain a quantiative determination of flaw dimensions, especially the depth of a crack, and the unwanted variation in signal applied to the amplifier means 25 may be such that this is no longer a reliable measure of the dimension which is required to be determined.

Accordingly, the amplifier 25 incorporates means for varying the gain, these means being operable by means of a control signal fed from the terminals $t_1$ and $t_2$ of the field coil circuit.

The voltage developed across terminals $t_2$ and $t_1$ is at a maximum when the resonant circuit is operating under conditions of resonance, and conveniently therefore the frequency of the carrier signal supplied by the oscillator power amplifier may be arranged to be slightly different from the resonant frequency of the circuit comprising the field coil and the capacitor $C_1$ for a particular distance separating the field coil from the workpiece. In this way increasing voltage will be obtained cross terminals $t_1$ and $t_2$ when the distance between the detector head and the surface of the workpiece tends to increase, while a decrease can be obtained for variations tending to decrease the distance or vice versa.

The variable gain amplifier itself may be of any suitable type, and it would be possible to employ a variable gain amplifier embodying one or more stages of amplifier using variable-mu tubes the control voltages being applied to the control grids of such tubes in a manner known per se.

Figure 3:
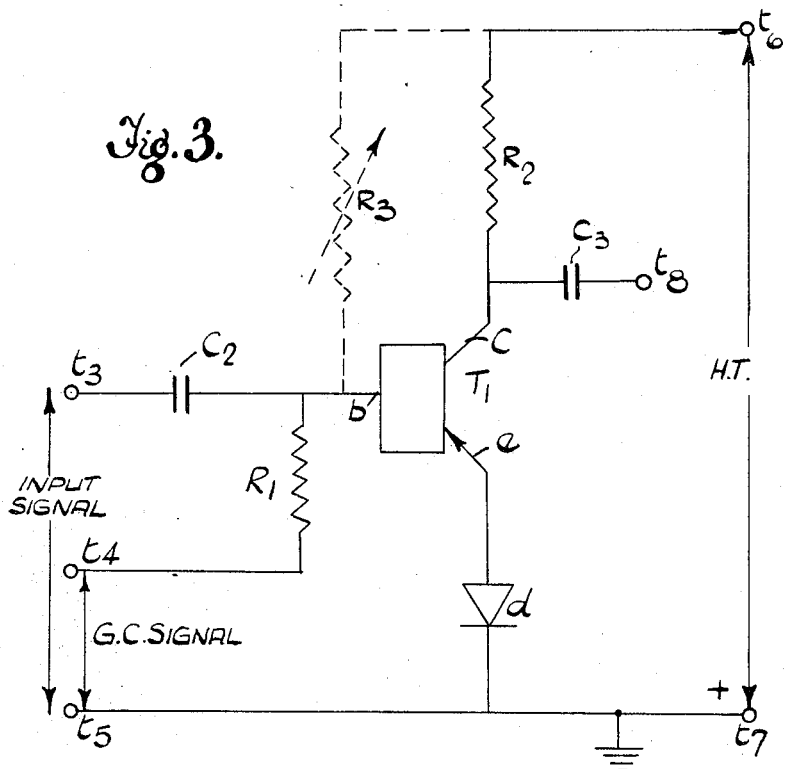
FIGURE 3 is a simplified circuit diagram of one suitable form of variable gain amplifier incorporated in the apparatus.
Figure 4:
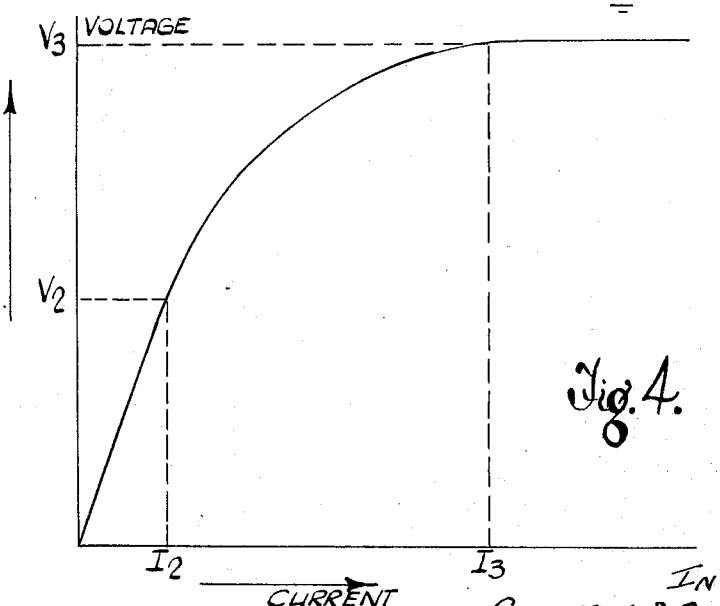
FIGURE 4 is a graph illustrating characteristics of operation of this amplifier.

A preferred form of apparatus is however, disclosed by way of example in FIGURES 3 and 4. FIGURE 3 shows a single stage of amplifier in which a transistor $T_1$ is connected in an input circuit and an output circuit.

The input circuit extends from terminals $t_3$ and $t_5$, the latter conveniently being at earth potential, through a coupling capacitor $C_2$ to the base $b$ of the transistor and thence from the emitter $e$ of the transistor to the ground line connected to terminal $t_5$ through the intermediary of a diode $d$.

The output circuit extends from terminals $t_6$ and $t_7$, the former being connected to the negative pole of a high tension source and the latter to the positive pole thereof which is grounded. The circuit extends from terminal $t_5$ through a load resistor $R_2$ to the collector $c$ of the transistor, and thence from the emitter $e$ thereof through the diode, back to the ground line and terminal $t_7$. A terminal $t_8$ is connected to the collector electrode C through a capacitor $C_3$, and the output signal is developed between terminal $t_8$ and either of terminals $t_6$ or $t_7$ as may be appropriate.

The diode $d$ affords a resistive component of impedance which varies as a function of the current passing through it. Preferably this diode is of the type known as a Zener diode which has an operating characteristic as indicated generally at FIGURE 4.

The constants of the circuit may be arranged to provide operation of the diode between voltages $V_2$ and $V_3$ representing an increase in current through the diode of approximately five times; typically the lower operating point corresponding to the voltage $V_2$ may represent a current $I_2$ of one milliampere through the diode, whilst the upper point represents approximately five milliamperes.

The slope of the characteristic which represents the resistive component of impedance may change at the lower operating point corresponding to $V_2$ from a value of say 1200 ohms to a value at the upper point corresponding to the voltage $V_3$ of only 25 ohms or thereabouts.

The proportion of the voltage developed in the output circuit between terminal $t_8$ and either of terminals $t_6$ and $t_7$, whichever may be convenient in any particular case, is determined by the resistive component of impedance presented by the diode $d$ which will, of course, in turn depend upon the slope at the particular point on the characteristic curve shown in FIGURE 4 selected for operation.

The selection of this point is determined primarily by the current flowing on the base emitter circuit of the transitor $t_1$, and as shown, such current may therefore typically be determined by a gain control signal applied between terminals $t_4$ and $t_5$ fed through a resistor $R_1$. In addition, a resistance or variable resistance $R_3$ might be connected between the base and a source of D.C. potential such as the negative pole connected to the terminal $t_6$ so that for any particular value of the gain control signal any suitable point of the characteristic curve shown in FIGURE 4 may be selected.

The amplifier has inherent stability arising from the fact that changes in the current produced in the output circuit as a result of current changes in the base-emitter circuit also produce a degenerative voltage across the diode $d$ that is providing negative feed-back to the base $b$. This is of particular value in an application wherein the control signal is derived from a variation which does not tend to be in itself offset or corrected as a result of the application of the control signal to the device thereby controlled. In other words, in a control system which is not of the type involving a closed servo-loop, the inherent stability due to the degenerative elements in that part of the circuit common to both input and output (in this instance the diode $d$) is of particular advantage in preventing drift or other instability.

The diode $d$ may be a silicon semi-conductor Zener diode, a specific example of a suitable type being that known as Mullard OAZ $20_1$.

In the particular example now described it will be understood that gain control signal is applied between terminals $t_4$ and $t_5$, and the output signal from the amplifier appears across terminals $t_8$ and $t_7$.

While in general the method and apparatus is applicable to workpieces in the form of stock since these normally afford surfaces of flat or curved plane form which can be scanned without difficulty by the unit comprising the field coil 13 and pick-up coils 16 whilst maintaining a constant separation or distance between the surface and the face or ends of these coils presented towards it, it would be within the scope of the invention to employ the method and the apparatus in relation to articles having a surface either of the plane form or having characteristics of configuration which do not interfere with the proper operation of the apparatus or performance of the method.

The field coil 13 and the pick-up coil 16 may be formed as printed elements by the application of electrically conductive material to a backing member of insulating material. In this form of construction the field coil may incorporate only a single loop or turn since this facilitates the maintenance of symmetry with respect to the pick-up coils.

Alternatively, the field coil 13 and the pick-up coil may each be formed from wire secured to a backing member or embedded or encapsulated therein.

It will be understood that, although connections to the pick-up coils have been shown as taken laterally therefrom, these may in practice emerge axially from the pick-up coils in a direction away from the workpiece since this facilitates the maintenance of symmetry about the reference axis. In the case illustrated the reference axis would be a diameter of the coil 13 perpendicular to the diameter on which the centre of the pick-up coils 16 lie.

Referring now to the constructional embodiment of the apparatus illustrated in FIGURES 5 to 8 this comprises the following main parts, a rotary head 30 (carrying the detector device), a drive motor 31 for transmitting rotation through a transmission means 32, an inlet guide structure 33 for guiding the workpiece along a guide path indicated by the line 34 at one side of the rotary head 30, and an outlet guide structure 35 for similarly guiding the workpiece at the other side of the rotary head 30.

Referring to the apparatus in more detail the main parts are mounted on a base plate 36 and the inlet guide structure is seen to comprise a bracket 37 including a base 38 formed with a dove-tailed cross section slideway as seen in FIGURE 8.

The slideway is engaged with an upstanding guide plate 39 of complementary dove-tailed shape cross section, one of the lateral faces of which has a lining strip 40 and the other of which is engaged with a pressure block 41 adjustable by means of a screw 42.

The guide plate 39 is of composite form including an upper component 43 and a lower component 44 of which the latter is secured by machine screws 45 to the base plate 36.

This arrangement permits of endwise movement of the bracket 37 and associated parts carried thereby in a direction lengthwise of the guide path 34.

At its upper end the bracket is apertured as indicated at 46 and is fitted with a dowel sleeve 47 on which is located a scroll chuck 48 having three radially slidable jaws 49.

Each jaw is furnished with a fork member 50 having a guide roller 51 journalled between the limbs of the fork.

A similar construction is adopted in respect of the outlet guide structure except that the bracket 52 is fixed relatively to the base plate 36, and the dowel sleeve 53 carries a scroll chuck 54 of which the three jaws 55 are each furnished with two fork members 56 and associated rollers 57.

It will be understood that in each case the scroll chucks permit simultaneous radial adjustment of the rollers 51 and 57 as the case may be by equal amounts in a radial direction towards and away from the guide path 34.

In between the two guide structures is mounted the rotating head 30. For this purpose bearing plates 58 and 59 are provided at opposite ends of the rotating head and are secured to the lower parts of the brackets 37 and 52 respectively.

These plates are formed with openings 60 and 61 containing bearings 62 and 63 for spigotal end portions 64 and 65 of a tubular element 66 which forms the core member of the rotating head.

At one end the tube element 65 is counter-bored to enlarge the diameter thereof as indicated at 67, and within the chamber 68 so formed is accommodated the head element of the detector device omitted for the sake of clarity from FIGURE 6 but seen in FIGURE 7 at 69. The wall of the chamber 68 is for this purpose furnished with a guide sleeve 70 in which the head element 69 is slidable radially, and when the apparatus is out of operation the head element is retracted in an outward radial direction by means of a spring 71 operatively connected with the head element through a bell crank lever 72 pivotally mounted on an arm 73 on the tubular element 66. The arm 72 carries a bob-weight 74.

Upon rotation of the tubular element 66 and bob-weight radial outward movement of the latter displaces the head element 69 in an inward radial direction to an extent determined by a stop member 75 having a threaded bore which enables it to be carried by and positionally adjusted along an adjustment screw 76.

The head element is in the form of a probe 69 is carried by a slide 77 having a laterally projecting stop member 78 which engages with the stop member 75 to determine the operating position of the head element relatively to the guide path 34, that is to say to determine the radial distance between the surface of the workpiece advanced along this path and the inwardly presented radial face of the head element 69.

A counter-weight 78 is provided to balance the rotating head.

At the inner end of the chamber 68 the tube element is formed with a radially projecting flange 79 in combination with which is assembled an annular component 80 of L-shape in cross section to enclose a chamber 81 which is lined with inner and outer cylindrical members 82 and 83 of insulating material between which are disposed annular end plates 84 and 85.

Certain components of the electronic equipment may be accommodated in this chamber. Desirably at least the carrier amplifier 21 is disposed in the chamber. Possibly the modulation detector 22, filter 23, and oscillator and power amplifier may be accommodated therein, but if the physical size or other consideration make it desirable for any one of these further units to be disposed elsewhere this may be done without serious disadvantage. The variable gain amplifier 25 is preferably disposed externally of the chamber at any suitable position.

Electrical connections from the units accommodated in the chamber 81 from power supply sources and to associated units externally of the chamber are made through the intermediary of a slip ring and brush system comprising a sleeve 87 of insulating material carried on a bush 88 on the end portion of the tubular element 68. Slip rings 89 are disposed in grooves in the sleeve 87 and co-operate with respective brush elements 90 carried by an arm 91 stationarily supported from the upper end of the bracket 58.

The rotating head is driven by means of a flat belt of rubber or other suitable material as indicated generally at 32 from the drive motor 31. The annular component 80 is provided with a tire or liner 92 of metal or other suitable material with which the belt 32 engages.

The inlet guide structure is provided with switch means for controlling the supply of current to the drive motor. These may take the form of a micro-switch 93 carried by a bracket 94 on the fixed part of one of the jaws 49.

In normal operation, the scroll-chuck 48 is adjusted so that the presence of the workpiece displaces the rollers 51 and fork members 50 radially outwards relative to the chuck-jaws 49, against the action of return springs 97.

A pin 95 projecting from the fork member 50 of this jaw disengages from the operating plunger 96 of the micro-switch whenever the roller 51 and fork member is displaced radially outward, and the micro-switch wiring is arranged in such a manner that this permits current to flow in the motor 31, causing rotation of the head 30. When the workpiece is not present, e.g. when the trailing end of a workpiece has passed the roller 51, this, and its associated fork member 50 and pin 95 return radially inward under the action of the spring 97, so engaging the operating plunger of the micro-switch, cutting off all current to the motor 31 and so stopping rotation of the head 30.

This arrangement enables the probe to be retracted rapidly from its operative position in which it is normally set to within 0.005″ to 0.050″ of the wire surface. Retraction occurs through the action of the spring 71 upon cessation of rotation, which is preferably rapidly arrested by means of a brake control, also operated by the micro-switch.

This avoids any "whipping" of the trailing end portion of the wire causing damage to the probe 69 during subsequent movement of this end portion through the tube element 68.

The advancement of the workpiece along the guide path 34 may be accomplished by any suitable or convenient means. For example, in one application, the device might be attached to a wire-drawing machine, the guide path 34 forming a part of the route along which the wire as a workpiece normally passes. The wire-drawing machine itself then imparts the necessary motion to the wire for advancement along the guide path 34. Alternatively, powered rollers or capstan drives might be separately provided in known manners to advance the workpiece, or in suitable cases, the workpiece might be advanced by hand.

It will be appreciated that it will be dependent upon the applications for which the stock passing through the device is intended, as to whether the electrical signals emanating from the variable gain amplifier 25, are used to operate indicator means 24, and/or a marking device or devices for impressing recognisable marks upon the stock being examined, and/or devices for recording the electrical signals on suitable media, such as paper, photographic film, magnetic tape, etc.

In one particular form of marking device described (shown diagrammatically in FIGURE 10) by way of example marking of the stock under examination occurs only when the output signal level from the variable gain amplifier 25 exceeds some specified value of voltage or current corresponding to the existence of a surface flaw in the stock exceeding some particular depth. The output signal of the amplifier 25 is fed into a circuit such as a Schmidt trigger, for example, which emits an electrical pulse of a suitable polarity when the input signal first exceeds a specific value. This pulse is then used to initiate the operation of a monostable circuit of definite period, which causes a rectangular pulse of suitable known duration to be drawn through the operating solenoid of a solenoid operated air valve 122. This allows compressed air, from a suitable source 123 to be allowed into the chamber 125 of an actuator 124 during the definite known period of operation of the solenoid air valve.

The transmission of pressure by means of the compressed air into the chamber 125 of the actuator moves the piston 126 down the body of the actuator against the action of the spring 128, so moving the scribe point 127 integrally connected with the piston. On release of the solenoid operated air valve at expiry of the known period, no further air reaches the chamber 125, and by virtue of a small leak orifice 129, the pressure in the chamber reduces, allowing spring 128 to retract the piston and scribe point against the stop 130. The actuator may be mounted at any suitable position such as on the chuck-jaws 55, in such a manner that the scribe point normally does not touch the stock, but so that on operation of the actuator, the scribe point is driven radially inwards towards the guide path 34. The stock is thus marked with a scratch near or at the portion of its length in which a flaw exceeding a critical predetermined value has been detected.

In certain applications of the device, it may be undesirable or impossible to effectively mark the stock by means of devices such as the one described situated close to the detection head. For example, the device might be mounted at or near the inlet of a multiple die wire drawing machine, where the operation of the machine on the flaw inspected wire would remove or deteriorate the marking, were it applied to the wire stock before its entry into the machine.

In such cases, the marking device may be physically removed from the neighbourhood of the detection device, and suitably placed at some convenient position, such as, for example, the outlet of the wire drawing machine, where any further working of the wire would not appreciably affect any applied marking, provided that a suitable means of delaying the operation of the actuator, corresponding to the time taken by the stock to travel from the detection head to the actuator, be inserted.

One form of marking means which may be employed in this case is illustrated in FIGURE 11. The physical separation existing between the detection head at the detection station and a marking means at a marking station is represented by a distance D along the length of the stock, assumed to be, for the sake of example, in the form of wire which has a forward speed V which may or may not be constant. The maximum forward speed of the wire is designated $V_{max}$. The delay time of the actuator 124 of the marking device, that is, the time between a signal being delivered to the actuator to perform its function, and the time at which the function is actually carried out, is designated $\tau$ ACT.

A wheel 136 is pressed against the wire, the forward motion of which causes the wheel to rotate with a circumferential speed equal to the forward speed of the wire. The radius of this wheel is designated R, and chosen to fulfill a relationship $D=2\pi RN+V_{max}\tau$ ACT where N is a suitable integer, to ensure that the mark applied to the wire will be coincident longitudinally with the corresponding flaw within the limits of accurate hereinafter explained.

A small sector insert 138 of conductive material in the otherwise insulating material of the wheel 136 is arranged to make contact with both contacts 137 once per revolution of the wheel, thus short-circuiting the wires 139 and 140. This action is arranged to initiate the production of an electrical pulse in each of two pulse generators 131 and 132.

The output of a level comparator and pulse generator 120, is passed into the first stage of a series of "shift register" stages 133 of which there are a total number N.

Such stages are bistable elements or circuits coupled together in such a way that a suitable voltage or current pulse inserted into each stage from a "shift" line causes each stage to take up the state that existed in the stage previous to it prior to the application of the pulse to the shift line. Various forms of "shift register stage" which conform to the above stated requirement are commercially available. A suitable form is that published in "Application Notes on Transwitches" published by Transistron Electronic Corporation Inc. The first stage is, at the same time, since it has no previous stage, returned to its basic state which is normally referred to ts the "off" or "O" condition. Any pulse from the level comparator and pulse generator, 120, corresponding to a flaw in the wire of a greater than selected depth is arranged to alter the state of the first shift register stage to the "on" or "I" condition. Thus, the condition "on" or "off" of each shift register stage at any particular time is representative of the presence or absence of a detected flaw in a particular discrete length ($2\pi R$) of wire and the conditions of all the shift register stages form a memory or store means of the presence or absence of cracks, the information being passed along the shift register stages of the memory or store means in step with the forward motion of the wire under inspection.

Coupling between the last shift register stage (N) and the variable delay pulse generator 134 is so arranged that the action of the latter is initiated only when the stage N receives a "shift" pulse and is consequently brought at that time to the "on" or "I" condition. The operation of the generator 134 is, therefore, initiated only when a signal corresponding to a flaw of greater than a selected depth passes out of the memory or store means, and this occurs at a time at which the wire will have moved forward a distance $2\pi RN$ from the position occupied at the time at which the flaw was detected.

Electrical pulses from the generator 132 are passed into an integrating circuit 135, whose output is a direct voltage corresponding in magnitude to the rate of forward advancement of the wire. This voltage is used to control the actual delay ($\tau D$) of the pulse generator 134 according to an approximate law $$\tau D = \tau \text{ ACT })V_{\max} - V)/V$$

The delayed pulse from 134 initiates the action of the pulse lengthener 121, after which, the action is as previously described.

It will be seen from this that the actuator will actually perform its function at a time after detection of a flaw, corresponding to the sum of the time taken for the wire to advance a distance $2\pi Rn$ and the operative delays $\tau D + \tau$ ACT. Since the wire is advancing at a velocity V, the operative delays correspond to a wire distance $$V(\tau_D + \tau_{ACT}) = V\left\{\tau_{ACT}\left(\frac{V_{\max} - V}{V} + \tau_{ACT}\right)\right\} = V_{\max} \cdot \tau_{ACT}$$

The marking of the wire will therefore actually occur at the portion of the wire at which a flaw was originally detected, to an accuracy of $\pm \pi RN$ in distance along the wire. By a suitable choice of diameter of wheel 136, and if necessary providing a multiplicity of contact sectors 138 on it, and suitably multiplying the number of shift register stages, this distance uncertainty can be reduced to as small a value as is desired.

It will be appreciated that where the rate of advancement of the wire is at constant speed, or, in situations in which the delay time of the actuator would cause only tolerable inaccuracy in marking, the pulse generator 132, integrator 135, and variable delay generator 134, may be omitted.

It will also be appreciated that such a "distance delay" scheme may be used with other forms of both detector and actuator than those described. For example, in an application in which the wire is passed into a screw-making machine, the actuator might be an accept or reject mechanism, and the detection head might be either as described, or any device measuring some suitable physical property of the wire on the characteristics of which acceptance or rejection might be required.

The expression "making means" is to be deemed to be used generally to mean any suitable form of actuator which operates to perform a required function whether marking, physically displacing or rejecting or applying some other identifiable treatment to a faulty portion of stock or component.

In the alternative arrangement illustrated in FIGURE 9, applicable to cases where the surface of the workpiece is of plane faced form, a workpiece in the form of a block, plate or billet is indicated at 100.

The head element 101 which incorporates the field coil and pick-up coils may be carried by an arm 102 supported from any suitable structure at a pivot 103 providing for pivotal movement about an axis perpendicular to the surface of the workpiece 100.

Scanning movement of the head element 101 in a direction crosswise of the workpiece which is advanced in the direction of the arrow 104 may be achieved by means of a crank wheel 105 having a crank pin 106 coupled to the end of the arm 102 remote from the head element 101 by means of a connecting rod 107.

The crank wheel 105 may be driven by transmission means from a source of power such as an electric motor.

What we then claim is:

1. Apparatus for flaw testing workpieces of electrically conductive material comprising:
   A. guide means defining a feed path for said workpiece through a detector station,
   B. a detector head at said station including
      (i) a field coil having an end face arranged in closely spaced at least approximately parallel relation to the surface of said workpiece to overlie an elemental area of said surface,
      (ii) at least a pair of pick-up coils having end faces also arranged in closely spaced at least approximately parallel relation to said surface and each of a smaller area than the field coil, and disposed within it as viewed normal to said surface, in respective positions spaced from each other in a predetermined direction to overlie different portions of said elemental area, said pick-up coils being connected in opposition,
      (iii) said field coil and said pick-up coil end faces being substantially the same distance from said surface,
   C. a source of high frequency alternating electric current forming a carrier, said source being connected with said field coil to set up an alternating magnetic field in a surface layer of said workpiece at said surface thereof and at said detection station to induce a predetermined eddy current pattern in circuits afforded by this layer in said elemental area, whereby voltages are induced in said pick-up coils of a magnitude and phase dependent on said eddy current pattern,
   D. mechanical means for effecting relative scanning movement in said predetermined direction between said workpiece on the one hand and said detector head on the other hand to cause said workpiece to move past said field coil and said pick-up coils without movement through them,
   E. said field coil and said pick-up coils having inductive coupling with said circuits in said surface layer of the workpiece through a magnetic field path, said path containing only non-magnetic and electrically non-conductive material, F. indicator means connected with said pick-up coils and including amplifier means and de-modulator means for separating from said carrier a modulation component of alternating voltages induced in said pick-up coils respectively and produced in response to said relative movement whenever a flaw in said surface layer passes said field coil and pick-up coils.

2. Apparatus according to claim 1 wherein said mechanical means for scanning is a rotary head on which said detector head is mounted, said feed path defined by said guide means extends axially of said rotary head to permit of longitudinal movement therealong of an elongated workpiece of circular cross section, said field coil and pick-up coils are mounted in said detector head in a position such that these coils are disposed substantially in planes at least approximately tangential to the surface of said workpiece, said pick-up coils being spaced apart angularly about said feed path.

3. Apparatus according to claim 1 wherein the field coil and pick-up coils are thin in comparison with their areas so as to be of generally flat form.

4. Apparatus according to claim 2 wherein:
A. said detector head is mounted for movement between an operative position close to said workpiece and an inoperative position at a greater radial distance therefrom,
B. retraction means are provided for moving said head to its inoperative position,
C. sensing means are disposed at a sensing station along said feed path on the approach side of said detection station to furnish a signal in response to the presence or absence of a workpiece at said sensing station,
D. means controlled by said signal are provided for producing movement of said detector head from its operative to its inoperative position by said retraction means.

5. Apparatus according to claim 4 wherein said detector head is movable from its inoperative to its operative position by centrifugal means, and said retraction means comprises biasing means opposing said centrifugal means, and said sensing means comprises a switch means connected in a supply circuit to a drive motor for rotating said rotary head.

References Cited by the Examiner

UNITED STATES PATENTS

| | | | |
|---|---|---|---|
| 2,011,425 | 8/1935 | Sperry et al. | 324—37 |
| 2,124,579 | 7/1938 | Knerr et al. | 324—40 |
| 2,162,710 | 6/1939 | Gunn | 324—37 |
| 2,246,906 | 6/1941 | Viebaha et al. | 324—37 |
| 2,414,224 | 1/1947 | Douglas | 324—34 |
| 2,441,380 | 5/1948 | Zuschlag | 324—34 |
| 2,878,447 | 3/1959 | Price et al. | 324—37 |
| 2,887,651 | 5/1959 | Piip | 324—40 |
| 2,918,621 | 12/1959 | Callan et al. | 324—37 |
| 2,965,840 | 12/1960 | Reuken et al. | 324—40 |
| 2,985,824 | 5/1961 | Reuken | 324—40 |
| 3,025,460 | 3/1962 | Callan et al. | 324—37 |

FOREIGN PATENTS 631,987 11/1949 Great Britain.

WALTER L. CARLSON, *Primary Examiner.*

R. E. KLEIN, R. J. CORCORAN, *Assistant Examiner.*